United States Patent
Chen et al.

(10) Patent No.: US 9,608,461 B2
(45) Date of Patent: Mar. 28, 2017

(54) BATTERY PACK COOLING AND CHARGING DEVICE AND METHOD

(71) Applicant: Chervon (HK) Limited, Wanchai (HK)

(72) Inventors: Ming Chen, Nanjing (CN); Junya Duan, Nanjing (CN); Xiaohong Lin, Nanjing (CN)

(73) Assignee: Chervon (HK) Limited, Wanchai (HK)

( * ) Notice: Subject to any disclaimer, the term of this patent is extended or adjusted under 35 U.S.C. 154(b) by 383 days.

(21) Appl. No.: 14/033,906

(22) Filed: Sep. 23, 2013

(65) Prior Publication Data
US 2014/0312843 A1    Oct. 23, 2014

(30) Foreign Application Priority Data
Apr. 22, 2013 (CN) .......................... 2013 1 0140954

(51) Int. Cl.
*H02J 7/00*    (2006.01)
*H01M 10/44*    (2006.01)
(Continued)

(52) U.S. Cl.
CPC .......... *H02J 7/0047* (2013.01); *H01M 10/44* (2013.01); *H01M 10/48* (2013.01);
(Continued)

(58) Field of Classification Search
CPC . H01M 10/6563; H01M 10/613; H01M 10/44
(Continued)

(56) References Cited

U.S. PATENT DOCUMENTS 4,860,185 A * 8/1989 Brewer et al. ................... 363/41
6,204,639 B1 * 3/2001 Takano ................. H02J 7/0003
320/150
(Continued)

FOREIGN PATENT DOCUMENTS

JP    2004171796 A  *  6/2004 ............ H01M 10/50
JP    2006213210       8/2006

OTHER PUBLICATIONS

Canadian Intellectual Property Office, Office Action and Examination Search Report issued on CA Appl. No. 2,828,575, dated Feb. 9, 2015, 6 pgs.

*Primary Examiner* — Samuel Berhanu
*Assistant Examiner* — Tarikh Rankine
(74) *Attorney, Agent, or Firm* — Greenberg Traurig, LLP (57) ABSTRACT

A battery pack cooling and charging device includes a charging module for a battery pack, a cooling fan, a power source module and a cooling fan control module. The cooling fan control module is capable of controlling the cooling fan for cooling and is connected with the cooling fan. During the charging operation, a rotational speed of the cooling fan for cooling the battery pack and a charging module is changed by detecting parameters such as fan operation time, a battery pack internal resistance, a charging module temperature, and a battery pack voltage. The rotational speed of the cooling fan is reasonably adjusted, thus noise of the cooling fan is reduced and energy consumption is reduced according to different phases of the charging process by regarding one parameter or combinations of parameters as conditions for changing the rotational speed of the fan.

4 Claims, 5 Drawing Sheets

(51) Int. Cl.
  *H01M 10/48*    (2006.01)
  *H01M 10/6563*  (2014.01)
  *H01M 10/613*   (2014.01)

(52) U.S. Cl.
  CPC ..... *H01M 10/613* (2015.04); *H01M 10/6563* (2015.04); *H02J 7/0042* (2013.01); *H01M 10/486* (2013.01)

(58) Field of Classification Search
  USPC ............... 363/21.02; 320/112, 150, 107
  See application file for complete search history.

(56) References Cited

U.S. PATENT DOCUMENTS

| | | | |
|---|---|---|---|
| 6,949,914 B2* | 9/2005 | Aradachi et al. | 320/150 |
| 7,692,408 B2* | 4/2010 | Miyazaki et al. | 320/150 |
| 8,111,035 B2* | 2/2012 | Nishino et al. | 320/103 |
| 2003/0052647 A1* | 3/2003 | Yoshida | B60L 3/0046 320/125 |
| 2007/0224039 A1* | 9/2007 | Hsu | F04D 29/542 415/199.1 |
| 2009/0266631 A1* | 10/2009 | Kikuchi | B60L 11/123 180/65.265 |
| 2012/0068668 A1 | 3/2012 | Kittell | |

\* cited by examiner

BATTERY PACK COOLING AND CHARGING DEVICE AND METHOD

RELATED APPLICATION INFORMATION

This application claims the benefit of CN 201310140954.8, filed on Apr. 22, 2013, the disclosure of which is incorporated herein by reference in its entirety.

FIELD OF THE DISCLOSURE

The present disclosure generally relates to the technical field of control circuitry and, more specifically, to a battery pack cooling and charging device and method.

BACKGROUND

The charging of a battery pack is limited by many factors among which temperature is a very important factor. In order to shorten the waiting time for discharging or charging a battery pack, a conventional battery pack charging device generally employs a fan to reduce temperature to thereby ensure that the battery pack in the charging device or a charging module is at an appropriate working temperature. Some battery packs with large power generate a lot of heat and need to use high power fans, thereby producing high noise. An appropriate temperature during the charging of the battery pack is capable of shortening the charging duration of the battery pack. Additionally, a typical high power fan for a charging device rotates at a constant rotational speed during the charging, and causes waste of electrical energy.

SUMMARY

The following describes a battery pack cooling and charging device and method, which can control the rotation speed of a cooling fan. The described battery pack cooling and charging device and method has the advantage of effectively reducing the noise of the fan, decreasing energy consumption of the fan, and providing excellent application prospects.

More particularly, an exemplary battery pack and charging device includes a charging module for the battery pack, a cooling fan and a power source module for supplying power. The battery pack cooling and charging device further includes a cooling fan control module, and the cooling fan control module is configured to control the cooling fan for cooling and is connected with the cooling fan.

In an exemplary battery pack cooling and charging device, the power source module includes an EMC (Electro Magnetic Compatibility) means, a rectifier and filter circuit and an LLC resonant converter, wherein an input end of the EMC means is externally connected to a utility power source, an output end of the EMC means is connected to an input end of the rectifier and filter circuit, an output end of the rectifier and filter circuit is divided into two paths: at one path, the output end is connected to the power source input end of the cooling fan and the cooling fan control module respectively, and at the other path, the output end is connected to a power source input end of the charging module via the LLC resonant converter.

In an exemplary battery pack cooling and charging device, the cooling fan control module includes a charging current collecting circuit, a charging module temperature detecting circuit, a charging module current controlling circuit, a cooling fan driving circuit and a microprocessor module, wherein the charging current collecting circuit, the charging module temperature detecting circuit, the charging module current controlling circuit and the cooling fan driving circuit are connected to the microprocessor module respectively, and the cooling fan driving circuit, as the output end of the cooling fan control module, is connected to the cooling fan.

A cooling and charging method based on the above battery pack cooling and charging device includes the following exemplary steps:

(1) placing the battery pack on the above cooling and charging device and performing electric connection;

(2) supplying electricity, judging whether the charging module and the battery pack normally communicate with the microprocessor module: if the communication is abnormal, the power supply is disconnected and electrical connection is detected and then step (2) is repeated until the communication gets normal and the flow proceeds to step (3);

(3) charging the battery pack, activating the cooling fan for cooling the battery pack, enabling the cooling fan to rotate at a first speed, and setting a control limit for slowing or switching off the cooling fan;

(4) the microprocessor module detecting whether to reach the set control limit for slowing or switching off the cooling fan: if the control limit for slowing or switching off the cooling fan as set in step (3) is not yet reached, detection will be continued until the set control limit for slowing or switching off the cooling fan is reached or surpassed, and the cooling fan is slowed to rotate at a second speed or switched off by controlling the output voltage of the cooling fan driving circuit;

(5) making judgment as to whether the charging for the battery pack is completed: if the charging is not yet completed, step (3) will be repeated; if the charging is completed, the cooling fan is switched off.

According to the battery pack cooling and charging method, the control limit for slowing or switching off the cooling fan as set in step (3) has the following exemplary modes: a time preset limit mode, a battery pack internal resistance preset limit mode, a charging module temperature preset limit module, a battery pack voltage preset limit mode and a charging current preset limit mode, wherein all the modes are used individually or in any combination thereof.

According to the battery pack cooling and charging method, the time preset limit mode includes the following exemplary steps:

1) the time preset limit for slowing or switching off the cooling fan is set to be greater than or equal to a predetermined value, such as 10 minutes, and time is kept by the microprocessor module when the fan begins to rotate at a first speed;

2) the microprocessor module judges whether a value of time kept reaches the time preset limit: if the control limit for slowing or switching off the cooling fan as set in step (3) is not yet reached, time continues to be kept until the value of time kept is equal to or greater than the time preset limit for slowing or switching off the cooling fan, and the cooling fan is slowed to rotate at a second speed or switched off by controlling the output voltage of the cooling fan driving circuit.

According to the battery pack cooling and charging method, the battery pack internal resistance preset limit mode includes the following exemplary steps:

1) the battery pack internal resistance preset limit for slowing or switching off the cooling fan is set to a calculated value, such as 15 mΩ multiplied by the number of batteries in the battery pack, and the charging current signal is collected via the charging current collecting circuit when the cooling fan begins to rotate at the first speed;

2) the microprocessor module calculates the battery pack internal resistance according to the charging current signal collected by the charging current collecting circuit, and judges whether the calculated battery pack internal resistance reaches the battery pack internal resistance preset limit: if the battery pack internal resistance preset limit for slowing or switching off the cooling fan as set in step (3) is not yet reached, collecting will be continued until the calculated battery pack internal resistance is equal to or greater than the battery pack internal resistance preset limit for slowing or switching off the cooling fan, and the cooling fan is slowed to rotate at a second speed or switched off by controlling the output voltage of the cooling fan driving circuit.

According to the battery pack cooling and charging method, the charging module temperature preset limit mode includes the following exemplary steps:

1) the charging module temperature preset limit for slowing or switching off the cooling fan is set to be greater than a predetermined temperature value, such as 50° C., and a charging module temperature signal is collected via the charging module temperature detecting circuit when the cooling fan begins to rotate at the first speed;

2) the microprocessor module calculates a charging module temperature value according to the charging module temperature signal collected by the charging module temperature detecting circuit, and judges whether the calculated charging module temperature value reaches the charging module temperature preset limit: if the charging module temperature preset limit for slowing or switching off the cooling fan as set in step (3) is not yet reached, collecting will be continued until the calculated charging module temperature value is equal to or greater than the charging module temperature preset limit for slowing or switching off the cooling fan, and the cooling fan is slowed to rotate at a second speed or switched off by controlling the output voltage of the cooling fan driving circuit.

According to the battery pack cooling and charging method, the battery pack voltage preset limit mode includes the following exemplary steps:

1) the battery pack voltage preset limit for slowing or switching off the cooling fan is set to be greater than a predetermined value, such as 52V, and a battery pack voltage signal is obtained by calculation when the cooling fan begins to rotate at the first speed;

2) the microprocessor module calculates a battery pack voltage value according to the battery pack voltage signal collected by the battery pack voltage detecting circuit, and judges whether the calculated battery pack voltage value reaches the set battery pack voltage preset limit: if the battery pack voltage preset limit for slowing or switching off the cooling fan as set in step (3) is not yet reached, collecting will be continued until the calculated battery pack voltage value is equal to or greater than the set battery pack voltage preset limit for slowing or switching off the cooling fan, and the cooling fan is slowed to rotate at a second speed or switched off by controlling the output voltage of the cooling fan driving circuit.

According to the battery pack cooling and charging method, the charging current preset limit mode includes the following exemplary steps:

1) the charging current preset limit for slowing or switching off the cooling fan is set to be greater than a predetermined value, such as 3 A with a duration of 30 seconds, and time is kept by the microprocessor module when the cooling fan begins to rotate at the first speed;

2) the microprocessor module judges whether a value of time kept reaches the charging current preset limit: if the control limit for slowing or switching off the cooling fan as set in step (3) is not yet reached, time continues to be kept until the value of time kept is equal to or greater than the time preset limit for slowing or switching off the cooling fan, and the cooling fan is slowed to rotate at a second speed or switched off by controlling the output voltage of the cooling fan driving circuit.

According to the battery pack cooling and charging method, the second speed may be 80 percent of the first speed.

Advantageous effects of the described embodiments are as follows: the battery pack cooling and charging device and method can effectively ensure existence of an appropriate temperature during the charging of the battery pack, shorten the time for charging the battery pack, and change the rotation speed of the fan for cooling the battery pack and the charging module by detecting parameters such as fan operation time, a battery pack internal resistance, a charging module temperature and a battery pack voltage during the charging by the charging device. The rotation speed of the cooling fan may be reasonably adjusted, noise of the cooling fan be effectively reduced and energy consumption of the fan be reduced according to different phases of the charging process by considering one parameter or combinations of parameters as conditions for changing the rotation speed of the cooling fan. The cooling and charging device and method according to the described embodiments thus promise excellent application prospects.

DETAILED DESCRIPTION OF PREFERRED EMBODIMENTS

The present invention will now be described in more detail with reference to the figures.

During the charging of a battery pack, a charging device constructed according to the following description can change a rotational speed of a cooling fan for cooling a battery pack and a charging module by detecting parameters such as fan operation time, a battery pack internal resistance, a charging module temperature and a battery pack voltage. The rotational speed of the cooling fan may be reasonably adjusted, thus noise of the fan is reduced and energy consumption of the fan is reduced according to different phases of the charging process by considering one parameter or combinations of parameters as conditions for changing the rotational speed of the fan.

Figure 1:
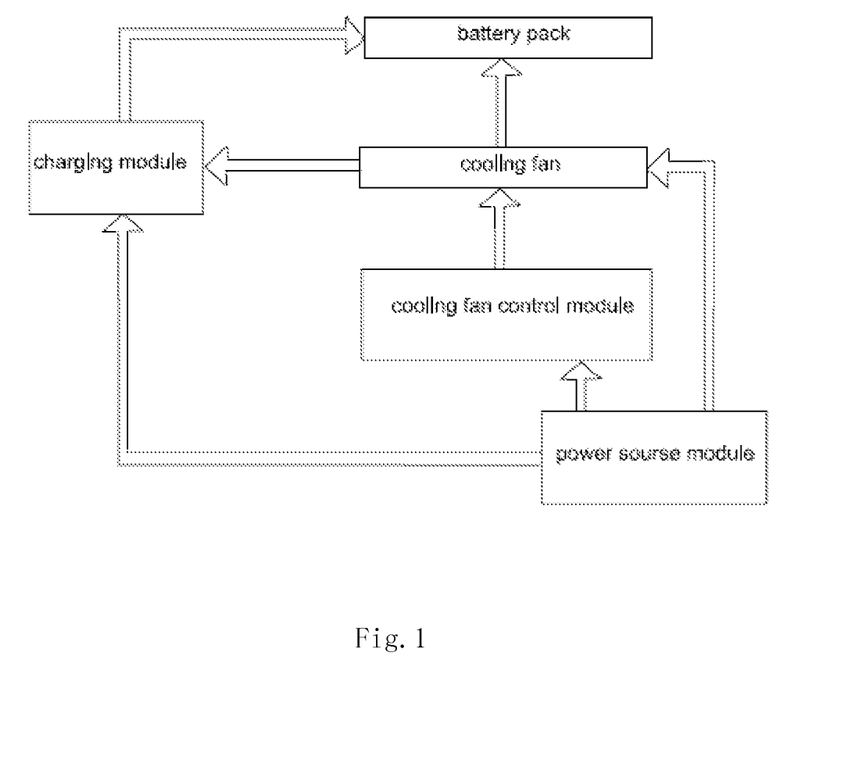
FIG. 1 is a systematic block diagram of an exemplary battery pack cooling and charging device constructed according to the description which follows.

As shown in FIG. 1, a battery pack cooling and charging device includes a charging module for the battery pack, a cooling fan for cooling the charging module and the battery pack, a power source module for powering the charging module and the cooling fan, and a cooling fan control module, wherein the cooling fan control module is capable of controlling rotation of the cooling fan and which is connected with the cooling fan.

Figure 2:
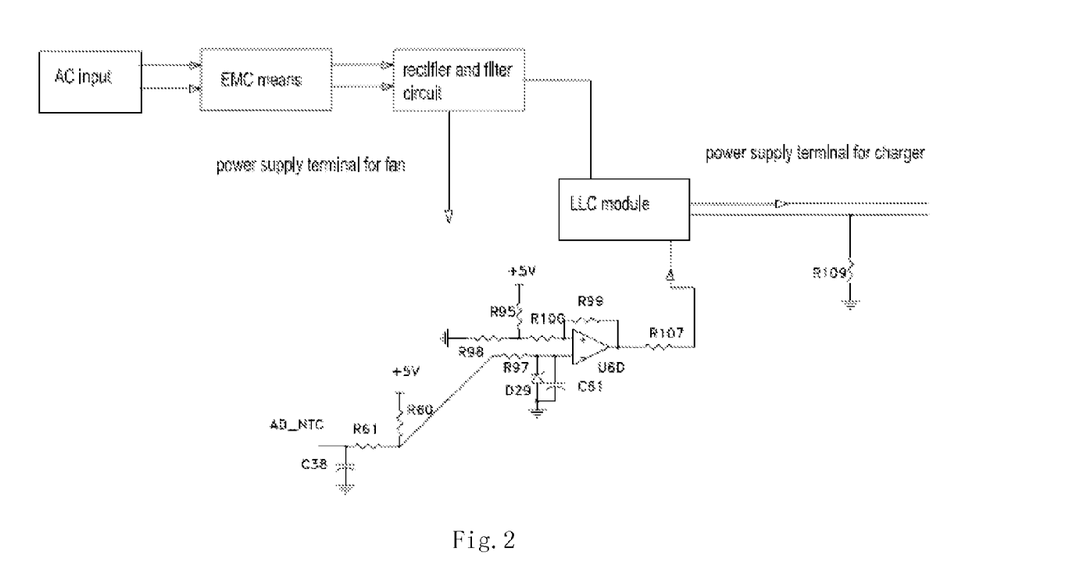
FIG. 2 is a schematic circuit diagram of an exemplary power source module constructed according to the description which follows.

As shown in FIG. 2, the power source module for powering the charging module and the cooling fan includes an EMC (Electro Magnetic Compatibility) means, a rectifier and filter circuit and an LLC resonant converter, wherein an input end of the EMC means is externally connected to a utility power source, namely, AC input end, an output end of the EMC means is connected to an input end of the rectifier and filter circuit, an output end of the rectifier and filter circuit is divided into two paths: at one path, the output end is connected to the power source input end of the cooling fan and the cooling fan control module, and at the other path, the output end is connected to a power source input end of the charging module via the LLC resonant converter, and the LLC resonant converter maintains stability of the charging voltage of the battery pack.

The cooling fan control module includes a charging current collecting circuit, a charging module current controlling circuit, a charging module temperature detecting circuit, a cooling fan driving circuit and a microprocessor module, wherein the charging current collecting circuit, the charging module current controlling circuit, the charging module temperature detecting circuit and a microprocessor module driving circuit are connected to the microprocessor module respectively, and the cooling fan driving circuit, as the output end of the cooling fan control module, is connected to the cooling fan.

Figure 3:
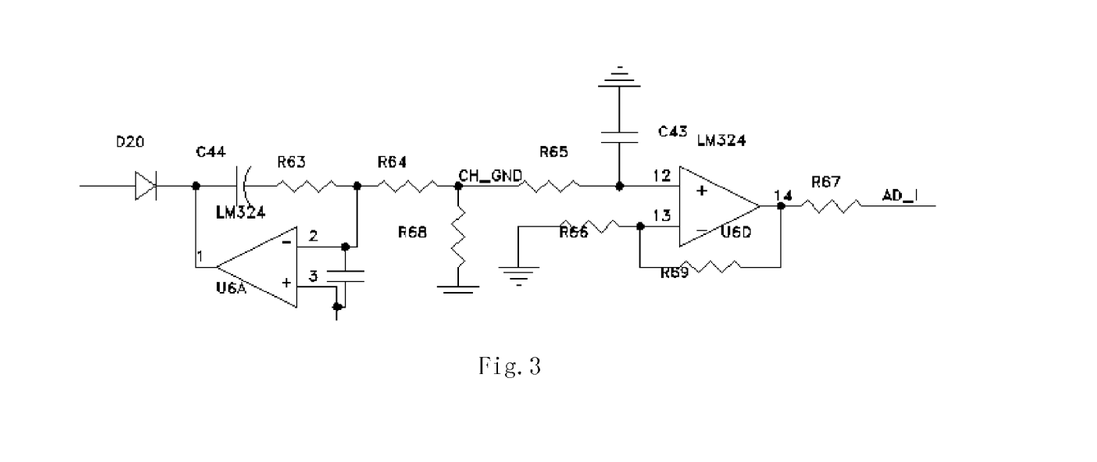
FIG. 3 is a schematic circuit diagram of an exemplary charging current collecting circuit constructed according to the description which follows.

As shown in FIG. 3, the charging current collecting circuit includes a sampling resistor R68 and an operational amplifier LM324, wherein the sampling resistor R68 allows a collected charging current signal through the operational amplifier LM324, and the charging current signal is transmitted to AD_I port of the microprocessor module.

Figure 4:
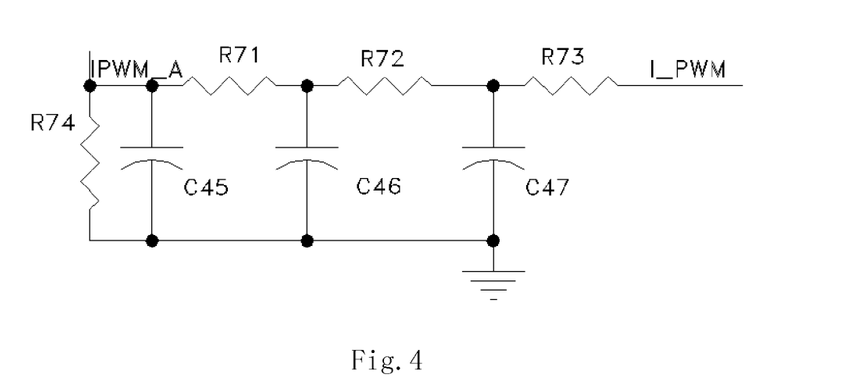
FIG. 4 is a schematic circuit diagram of an exemplary charging module circuit controlling circuit constructed according to the description which follows.

As shown in FIG. 4, the charging module current controlling circuit includes resistors R74, R71, R72 and R73 which are connected in series, wherein filter capacitors C45, C46 and C47 are provided between two of said resistors, and an external I_PWM port of the resistor R73 serves as a charging module current output control end to control the output current of the charging module.

Figure 5:
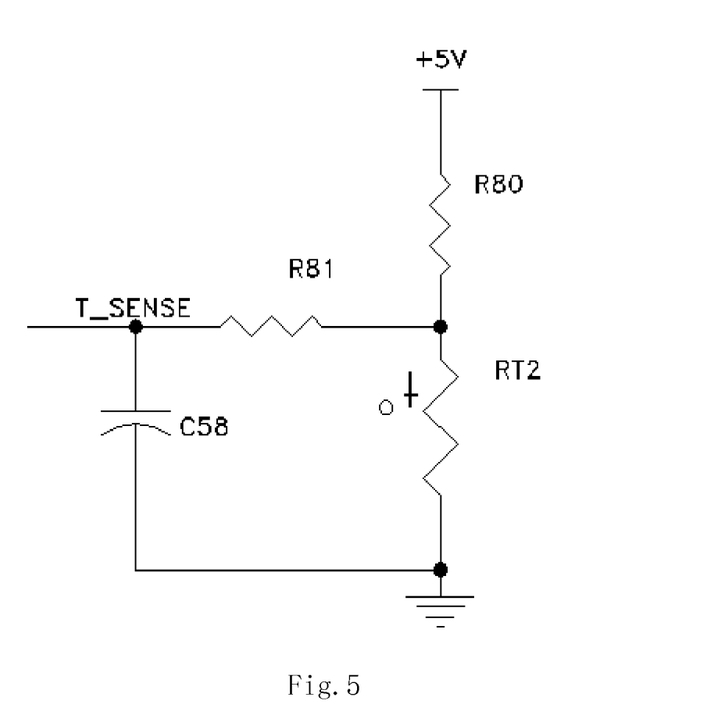
FIG. 5 is a schematic circuit diagram of an exemplary charging module temperature detecting circuit constructed according to the description which follows.

As shown in FIG. 5, the charging module temperature detecting circuit includes a thermistor RT2 which is used to collect the charging module temperature, and connects to a T_SENSE port of the microprocessor module.

Figure 6:
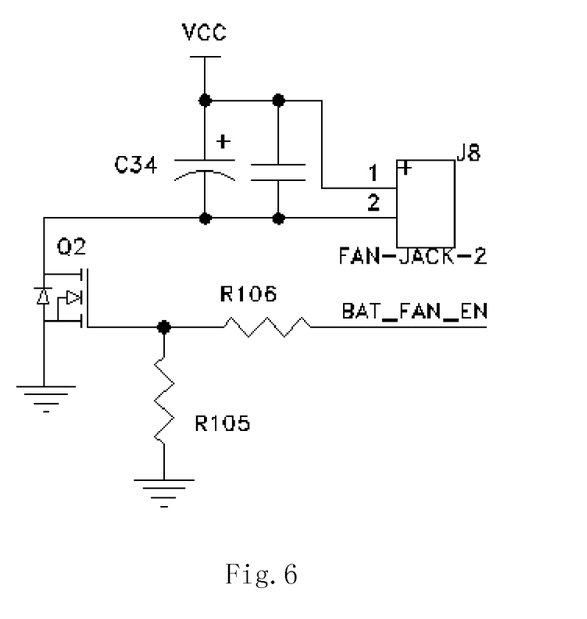
FIG. 6 is a schematic circuit diagram of an exemplary cooling fan driving circuit constructed according to the description which follows.

As shown in FIG. 6, the cooling fan driving circuit is used to control a rotational speed of the cooling fan to cool the charging module and the battery pack, there are ports CHAR_FAN_EN and BAT_FAN_EN in the driving circuit to control the rotation speed of the cooling fan, the ports CHAR_FAN_EN and BAT_FAN_EN are connected to the microprocessor module, and the rotations speed or switch-on and off of the cooling fan are controlled via a MOS transistor Q9 and a triode Q2.

The battery pack cooling and charging device according to the present invention operates in the following process:

1) When the battery pack is inserted on the charging module, the cooling fan begins to work at a high speed to quickly dissipate heat for the battery pack;

2) The rotational speed of the cooling fan is adjusted during the charging process:

a. when the work duration of the cooling fan reaches a predetermined time, the rotational speed of the cooling fan is lowered or the cooling fan is switched off;

b. the rotational speed of the cooling fan is adjusted according to the internal resistance of the battery pack: the greater the internal resistance is, the higher the rotational speed is; the smaller the internal resistance is, the lower the rotational speed is;

c. the rotational speed of the cooling fan is adjusted by detecting the temperature of the charging module;

3) after completion of the charging, the cooling fan is turned off.

Figure 7:
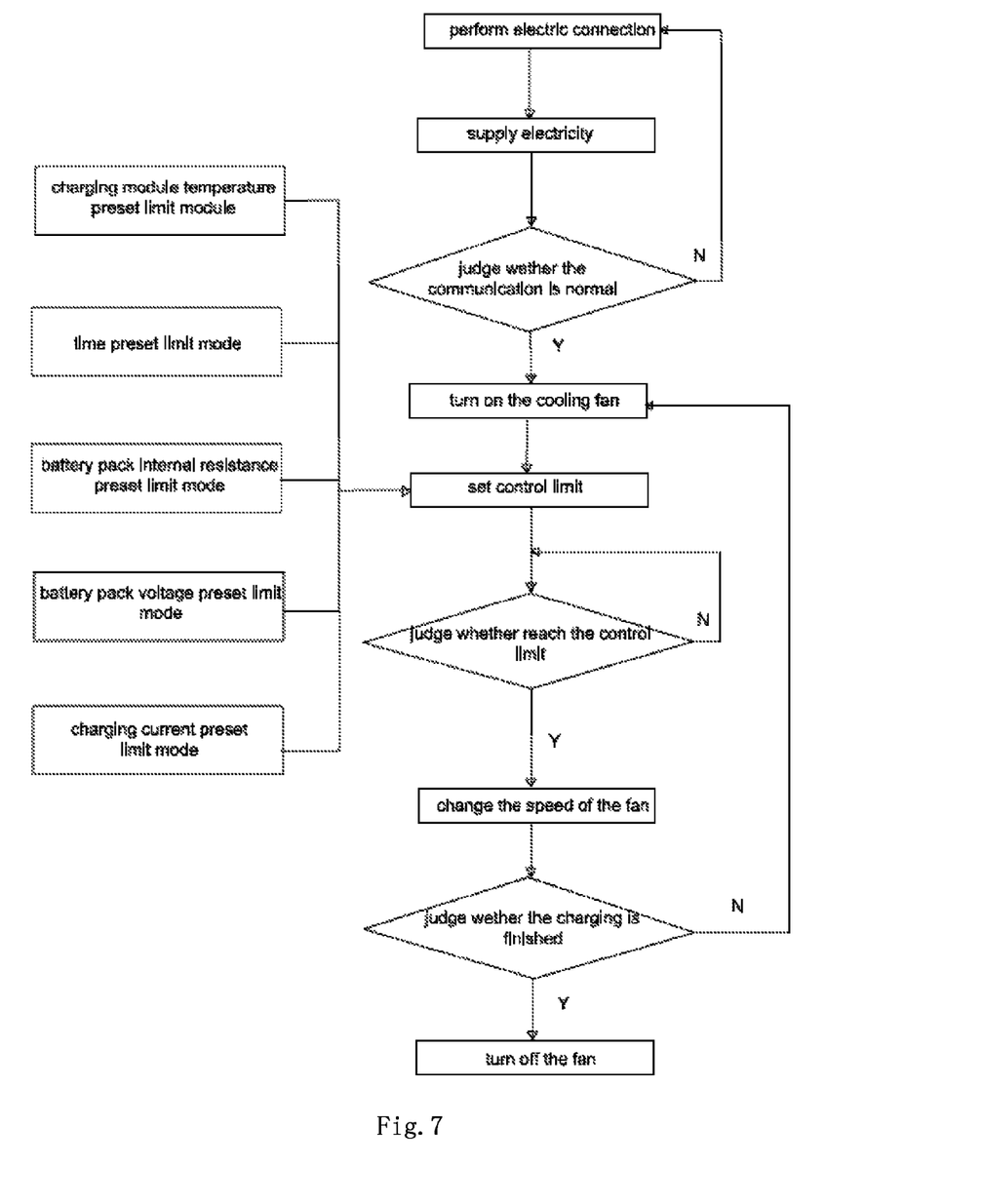
FIG. 7 is a flow chart of an exemplary battery pack cooling and charging method according to the description which follows.

According to the exemplary battery pack cooling and charging method during the charging of the battery pack, the rotational speed of the cooling fan for cooling a battery pack and a charging module is changed by detecting parameters such as fan operation time, a battery pack internal resistance, a charging module temperature, a battery pack voltage and charging current. The rotational speed of the cooling fan may be reasonably adjusted, thus noise of the cooling fan is reduced and energy consumption is reduced according to different phases of the charging process by regarding one parameter or combinations of parameters as conditions for changing the rotational speed of the fan. The cooling and charging method is a charging method implemented on the battery pack cooling and charging device. As shown in FIG. 7, the cooling and charging method includes the following steps:

in a first step, the battery pack is placed on the above cooling and charging device and electrically connected;

in a second step, electricity is supplied to judge whether the charging module and the battery pack normally communicate with the microprocessor module: if the communication is abnormal, power supply is disconnected and electrical connection is detected and then the second step is repeated until the communication gets normal and the flow proceeds to the third step;

in a third step, the battery pack is charged, the cooling fan for cooling the battery pack is activated, the cooling fan rotates at a first speed, and a control limit for slowing or switching off the cooling fan is set;

in a fourth step, the microprocessor module detects whether to reach the set control limit for slowing or switching off the cooling fan: if the control limit for slowing or switching off the cooling fan as set in the third step is not yet reached, detection will be continued until the set control limit for slowing or switching off the cooling fan is reached or surpassed, and the cooling fan is slowed to rotate at a second speed or switched off by controlling the output voltage of the cooling fan driving circuit;

in a fifth step, judgment is made for judging whether the charging for the battery pack is completed: if the charging is not yet completed, the third step will be repeated; if the charging is completed, the cooling fan is switched off.

The control limit for slowing or switching off the cooling fan as set in the third step has the following modes: a time preset limit mode, a battery pack internal resistance preset limit mode or a charging module temperature preset limit module or a battery pack voltage preset limit mode or a charging current preset limit mode, wherein all the modes are used individually or in any combination thereof.

The time preset limit mode includes the following steps:

1) the time preset limit for slowing or switching off the cooling fan is set to be greater than or equal to a predetermined value, such as 10 minutes, and time is kept by the microprocessor module when the fan begins to rotate at a first speed;

2) the microprocessor module judges whether a value of time kept reaches the time preset limit: if the control limit for slowing or switching off the cooling fan as set in the third step is not yet reached, time continues to be kept until the value of time kept is equal to or greater than the time preset limit for slowing or switching off the cooling fan, and the cooling fan is slowed to rotate at a second speed or switched off by controlling the output voltage of the cooling fan driving circuit.

The battery pack internal resistance preset limit mode includes the following steps:

1) the battery pack internal resistance preset limit for slowing or switching off the cooling fan is set to a calculated value, such as 15 mΩ multiplied by the number of batteries in the battery pack, and the charging current signal is collected via the charging current collecting circuit when the cooling fan begins to rotate at the first speed;

2) the microprocessor module calculates the battery pack internal resistance according to the charging current signal collected by the charging current collecting circuit; a method of calculating the battery internal resistance is calculating $Ic1*Ri+Uo1=Uc1$; $Ic2*Ri+Uo2=Uc2$ according to two sets of different data as detected, wherein a detected voltage at both ends of the battery is assumed as Uc, the battery internal resistance as Ri, a charging current as Ic, and an intra-battery equivalent voltage source Uo.

Provided that a time interval for detecting two sets of data be approximated as $Uo1=Uo2$, the internal resistance will be $Ri=(Uc2-Uc1)/(Ic2-Ic1)$.

Judgment is made for whether the battery pack internal resistance reaches the battery pack internal resistance preset limit: if the battery pack internal resistance preset limit for slowing or switching off the cooling fan as set in step 3 is not yet reached, collecting will be continued until the calculated battery pack internal resistance is equal to or greater than the battery pack internal resistance preset limit for slowing or switching off the cooling fan, and the cooling fan is slowed to rotate at a second speed or switched off by controlling the output voltage of the cooling fan driving circuit.

The charging module temperature preset limit mode includes the following steps:

1) the charging module temperature preset limit for slowing or switching off the cooling fan is set to be greater than a predetermined value, such as 50° C., and a charging module temperature signal is collected via the charging module temperature detecting circuit when the cooling fan begins to rotate at the first speed;

2) the microprocessor module calculates a charging module temperature value according to the charging module temperature signal collected by the charging module temperature detecting circuit, and judges whether the calculated charging module temperature value reaches the charging module temperature preset limit: if the charging module temperature preset limit for slowing or switching off the cooling fan as set in the third step is not yet reached, collecting will be continued until the calculated charging module temperature value is equal to or greater than the charging module temperature preset limit for slowing or switching off the cooling fan, and the cooling fan is slowed to rotate at a second speed or switched off by controlling the output voltage of the cooling fan driving circuit.

The battery pack voltage preset limit mode includes the following steps:

1) the battery pack voltage preset limit for slowing or switching off the cooling fan is set to be greater than a predetermined value, such as 52V, and a battery pack voltage signal is obtained by calculation when the cooling fan begins to rotate at the first speed;

2) the microprocessor module calculates a battery pack voltage value according to the battery pack voltage signal collected by the battery pack voltage detecting circuit, and judges whether the calculated battery pack voltage value reaches the set battery pack voltage preset limit: if the battery pack voltage preset limit for slowing or switching off the cooling fan as set in the third step is not yet reached, collecting will be continued until the calculated battery pack voltage value is equal to or greater than the set battery pack voltage preset limit for slowing or switching off the cooling fan, and the cooling fan is slowed to rotate at a second speed or switched off by controlling the output voltage of the cooling fan driving circuit.

The charging current preset limit mode includes the following steps:

1) the charging current preset limit for slowing or switching off the cooling fan is set to be greater than a predetermined value, such as 3 A with a duration of 30 seconds, and time is kept by the microprocessor module when the cooling fan begins to rotate at the first speed;

2) the microprocessor module judges whether a value of time kept reaches the charging current preset limit: if the control limit for slowing or switching off the cooling fan as set in the first step is not yet reached, time continues to be kept until the value of time kept is equal to or greater than the time preset limit for slowing or switching off the cooling fan, and the cooling fan is slowed to rotate at a second speed or switched off by controlling the output voltage of the cooling fan driving circuit.

The second speed as stated above is preferred to be about 80 percent of the first speed.

To conclude, the battery pack cooling and charging device and method according to the present invention can effectively ensure existence of an appropriate temperature during the charging of the battery pack, shorten the time for charging the battery pack, and change the rotational speed of the cooling fan for cooling the battery pack and the charging module by detecting parameters such as fan operation time, a battery pack internal resistance, a charging module temperature and a battery pack voltage and a charging current during the charging by the charging device. The rotational speed of the cooling fan may be reasonably adjusted, noise of the cooling fan be effectively reduced and energy consumption of the fan be reduced according to different phases of the charging process by regarding one parameter or combinations of parameters as conditions for changing the rotational speed of the cooling fan. The cooling and charging device and method according to the present invention promises excellent application prospects.

The above illustrates and describes basic principles, main features and advantages of the present invention. Those skilled in the art shall appreciate that the present invention is not limited to the above embodiments. The above embodiments and description only depict the principles of the present invention. Those skilled in the art can understand that various modifications and variations to the invention will be regarded as falling within the scope of the claims the present invention so long as they do not depart from the spirit and scope of the present invention. The protection scope of the present invention is defined by the appended claims and their equivalents.

What is claimed is:

1. A battery pack cooling and charging method, the cooling and charging method implemented on a battery pack cooling and charging device having a cooling fan, the method comprising:
receiving a battery pack on the cooling and charging device and performing an electrical connection between the battery pack and the cooling and charging device;
connecting a power supply to the battery pack;
determining whether a charging module of the cooling and charging device and the battery pack are in communication with a microprocessor module of the cooling and charging device and, if the charging module of the cooling and charging device and the battery pack are not in communication with the microprocessor module of the cooling and charging device, disconnecting and reconnecting the power supply repeating the disconnecting and reconnecting process until the charging module of the cooling and charging device and the battery pack are in communication with the microprocessor module of the cooling and charging device;
when the charging module of the cooling and charging device and the battery pack are in communication with the microprocessor module of the cooling and charging device, charging the battery pack, activating the cooling fan for cooling the battery pack, enabling the cooling fan to rotate at a first speed, and setting a control limit for slowing or switching off the cooling fan;
detecting by the microprocessor module of the cooling and charging device whether to reach a set control limit for slowing or switching off the cooling fan and, when the set control limit for slowing or switching off the cooling fan is not yet reached, continuing detection until the set control limit for slowing or switching off the cooling fan is reached or surpassed whereupon the cooling fan is slowed to rotate at a second speed or switched off by controlling an output voltage of a cooling fan driving circuit; and
determining whether the charging for the battery pack is completed and, when the charging is completed, switching off the cooling fan,
wherein the control limit for slowing or switching off the cooling fan is a battery pack internal resistance preset limit,
setting the battery pack internal resistance preset limit for slowing or switching off the cooling fan to a predetermined value and collecting a charging current signal via a charging current collecting circuit when the cooling fan begins to rotate at the first speed;
calculating by the microprocessor module internal resistance according to the charging current signal collected by the charging current collecting circuit, determining whether the calculated battery pack internal resistance reaches the battery pack internal resistance preset limit, and, when the battery pack internal resistance preset limit for slowing or switching off the cooling fan is not yet reached, continuing the step of collecting until the calculated battery pack internal resistance is equal to or greater than the battery pack internal resistance preset limit for slowing or switching off the cooling fan whereupon the cooling fan is slowed to rotate at the second speed or switched off by controlling the output voltage of the cooling fan driving circuit.

2. A battery pack cooling and charging method, the cooling and charging method implemented on a battery pack cooling and charging device having a cooling fan, the method comprising:
receiving a battery pack on the cooling and charging device and performing an electrical connection between the battery pack and the cooling and charging device;
connecting a power supply to the battery pack;
determining whether a charging module of the cooling and charging device and the battery pack are in communication with a microprocessor module of the cooling and charging device and, if the charging module of the cooling and charging device and the battery pack are not in communication with the microprocessor module of the cooling and charging device, disconnecting and reconnecting the power supply repeating the disconnecting and reconnecting process until the charging module of the cooling and charging device and the battery pack are in communication with the microprocessor module of the cooling and charging device;
when the charging module of the cooling and charging device and the battery pack are in communication with the microprocessor module of the cooling and charging device, charging the battery pack, activating the cooling fan for cooling the battery pack, enabling the cooling fan to rotate at a first speed, and setting a control limit for slowing or switching off the cooling fan;
detecting by the microprocessor module of the cooling and charging device whether to reach a set control limit for slowing or switching off the cooling fan and, when the set control limit for slowing or switching off the cooling fan is not yet reached, continuing detection until the set control limit for slowing or switching off the cooling fan is reached or surpassed whereupon the cooling fan is slowed to rotate at a second speed or switched off by controlling an output voltage of a cooling fan driving circuit; and
determining whether the charging for the battery pack is completed and, when the charging is completed, switching off the cooling fan,
wherein the control limit for slowing or switching off the cooling fan is a charging current preset limit,
setting the charging current preset limit for slowing or switching off the cooling fan to a predetermined value and keeping time by the microprocessor module when the cooling fan begins to rotate at the first speed;
determining by the microprocessor module whether a value of time kept reaches the charging current preset limit and when the control limit for slowing or switching off the cooling fan is not yet reached, continuing the step of keeping time until the value of time kept is equal to or greater than the time preset limit for slowing or switching off the cooling fan whereupon the cooling fan is slowed to rotate at the second speed or switched off by controlling the output voltage of the cooling fan driving circuit.

3. The battery pack cooling and charging method according claim 2, wherein the second speed is approximately 80 percent of the first speed.

4. The battery pack cooling and charging method according to claim 1, wherein a method of calculating the battery internal resistance is calculating $I_{c1}*R_t+U_{o1}=U_{c1}$, $I_{c2}*R_t+U_{o2}=U_{c2}$ according to two sets of different data as detected, wherein a detected voltage at both $U_{o2}$ ends of the battery is assumed as $U_c$, the battery internal resistance as $R_i$, a charging current as $I_c$, and an intra-battery equivalent voltage source $U_o$, providing that a time interval for detecting two sets of data be approximated as $U_{o1}=U_{o2}$, the internal resistance is $R_i=(U_{c2}-U_{c1})/(I_{c2}-I_{c1})$.

\* \* \* \* \*

UNITED STATES PATENT AND TRADEMARK OFFICE
CERTIFICATE OF CORRECTION

| | |
|---|---|
| PATENT NO. | : 9,608,461 B2 |
| APPLICATION NO. | : 14/033906 |
| DATED | : March 28, 2017 |
| INVENTOR(S) | : Ming Chen et al. |

It is certified that error appears in the above-identified patent and that said Letters Patent is hereby corrected as shown below:

On the Title Page

Item (73) Assignee: [Chevron] should be "Chervon"

Signed and Sealed this
Sixth Day of August, 2024

Katherine Kelly Vidal
*Director of the United States Patent and Trademark Office*